US006994812B1

(12) United States Patent
DeMoe et al.

(10) Patent No.: US 6,994,812 B1
(45) Date of Patent: Feb. 7, 2006

(54) MOLD TOOL AND METHOD FOR FORMING A TRIM COVERED FOAM SUBSTRATE OF A SEAT ASSEMBLY

(75) Inventors: Larry F. DeMoe, Harrow (CA); Kurt Fleuchaus, Belle River (CA); Jens Kresin, Port Perry (CA)

(73) Assignee: Intier Automotive Inc., Aurora (CA)

( * ) Notice: Subject to any disclaimer, the term of this patent is extended or adjusted under 35 U.S.C. 154(b) by 0 days.

(21) Appl. No.: 10/110,513

(22) PCT Filed: Oct. 12, 2000

(86) PCT No.: PCT/CA00/01161

§ 371 (c)(1),
(2), (4) Date: Jul. 7, 2003

(87) PCT Pub. No.: WO01/26883

PCT Pub. Date: Apr. 19, 2001

Related U.S. Application Data

(60) Provisional application No. 60/158,955, filed on Oct. 12, 1999.

(51) Int. Cl.

| | |
|---|---|
| ***B29C 33/02*** | (2006.01) |
| ***B29C 35/02*** | (2006.01) |
| ***B29C 41/08*** | (2006.01) |
| ***B29C 41/20*** | (2006.01) |

(52) U.S. Cl. ..................... 264/46.4; 264/259; 264/266; 264/309; 264/319; 425/4 R; 425/407

(58) Field of Classification Search ................ 425/4 R, 425/116, 121, 547, 407; 264/45.1, 45.4, 264/46.4, 259, 265, 266, 275, 309, 319
See application file for complete search history.

(56) References Cited

U.S. PATENT DOCUMENTS

| | | | | |
|---|---|---|---|---|
| 2,955,972 A | | 10/1960 | Wintermute et al. | |
| 3,932,252 A | | 1/1976 | Woods | |
| 3,962,387 A | | 6/1976 | Hendry | |
| 3,962,392 A | | 6/1976 | Conner, Jr. | |
| 4,078,100 A | * | 3/1978 | Doerfling | 427/314 |
| 4,089,919 A | * | 5/1978 | Sanson | 264/46.6 |
| 4,096,303 A | * | 6/1978 | Doerfling | 428/91 |
| 4,116,736 A | * | 9/1978 | Sanson et al. | 156/79 |
| 4,192,638 A | | 3/1980 | Lezier et al. | |
| 4,737,226 A | * | 4/1988 | Inoue | 156/245 |
| 4,743,323 A | * | 5/1988 | Hettinga | 156/160 |

(Continued)

FOREIGN PATENT DOCUMENTS

DE 197 54 180 A1 12/1997

(Continued)

*Primary Examiner*—Angela Ortiz
(74) *Attorney, Agent, or Firm*—Clark Hill PLC

(57) ABSTRACT

A mold tool (16) for forming a trim covered foam substrate of a seat assembly comprises an upper mold cast (18) defining an upper mold surface (19) and a lower mold cast (20) defining a lower mold surface (2). A split line (28) is defined adjacent to the upper and lower mold surfaces between the upper mold cast and the lower mold cast when the mold casts are in facing mating engagement forming a mold cavity (22) therebetween. A plurality of heat lines (24) extend through the upper (18) and lower (19) mold casts adjacent the respective upper and lower mold surfaces for heating the mold cavity (22). A cooling line (30) extends through at least one of the upper and lower mold casts adjacent the split line (28) for cooling the split line of the mold tool.

5 Claims, 1 Drawing Sheet

U.S. PATENT DOCUMENTS

| | | | | | |
|---|---|---|---|---|---|
| 4,765,045 | A | | 8/1988 | Selbert et al. | |
| 4,829,644 | A | | 5/1989 | Kondo et al. | |
| 4,831,697 | A | | 5/1989 | Urai | |
| 4,852,228 | A | | 8/1989 | Zeilinger | |
| 4,874,448 | A | * | 10/1989 | Urai | 156/196 |
| 4,952,358 | A | * | 8/1990 | Okina et al. | 264/134 |
| 4,987,666 | A | | 1/1991 | Smith | |
| 5,231,745 | A | | 8/1993 | Phelan et al. | |
| 5,231,746 | A | | 8/1993 | Rohn | |
| 5,238,513 | A | * | 8/1993 | Gill | 156/64 |
| 5,413,661 | A | * | 5/1995 | Spengler et al. | 156/515 |
| 5,534,097 | A | * | 7/1996 | Fasano et al. | 156/214 |
| 5,545,366 | A | | 8/1996 | Lust et al. | |
| 5,743,979 | A | | 4/1998 | Lorbiecki | |
| 6,685,863 | B1 | * | 2/2004 | Yabushita et al. | 264/254 |

FOREIGN PATENT DOCUMENTS

| | | |
|---|---|---|
| EP | 0 569 846 A3 | 5/1993 |
| FR | 2204116 | 10/1972 |
| FR | 2381618 | 2/1977 |

* cited by examiner

MOLD TOOL AND METHOD FOR FORMING A TRIM COVERED FOAM SUBSTRATE OF A SEAT ASSEMBLY

This application claims the benefit of Provisional Application No. 60/158,955, filed Oct. 12, 1999.

BACKGROUND OF THE INVENTION

1) Field of the Invention

The subject invention relates to a mold tool for forming a trim covered foam substrate of a seat assembly.

2) Detailed Description of the Related Art

A vehicle seat is typically formed from a molded urethane foam substrate that is surrounded by a decorative trim cover. The manufacturing method includes securing the cover to an upper cast of a mold tool and spraying liquid urethane foam into a lower cast of a mold tool. The cover includes a skirt that protrudes through a split line between the first cast and the second cast when the two casts are in mating engagement. The split line, and heat generated in the mold tool by heating lines, and by the exothermic urethane crosslinking reaction, disfigure the portion of the trim cover within the split line. The trim cover must be restored by the supplementary step of steaming the cover. However, often the cover can not be restored, particularly for less expensive, lower quality covers.

Therefore, it is desirable to provide a mold tool and method that does not cause disfiguring damage to the trim cover and will improve manufacturing cycle time and enable the use of less expensive, lower quality covers.

SUMMARY OF THE INVENTION

The subject invention relates to a mold tool for forming a trim covered foam substrate of a seat assembly. The mold tool comprises an upper mold cast defining an upper mold surface and a lower mold cast defining a lower mold surface. A split line is defined adjacent to the upper and lower mold surfaces between the upper mold cast and the lower mold cast when the mold casts are in facing mating engagement forming a mold cavity therebetween. A plurality of heat lines extend through at least one of the upper and lower mold casts adjacent the respective upper and lower mold surfaces for heating the mold cavity. A cooling line extends through at least one of the upper and lower mold casts adjacent the split line for cooling the split line of the mold tool.

BRIEF DESCRIPTION OF THE DRAWINGS

Advantages of the present invention will be readily appreciated as the same becomes better understood by reference to the following detailed description when considered in connection with the accompanying drawings wherein.

DETAILED DESCRIPTION OF THE PREFERRED EMBODIMENT

Figure 1:
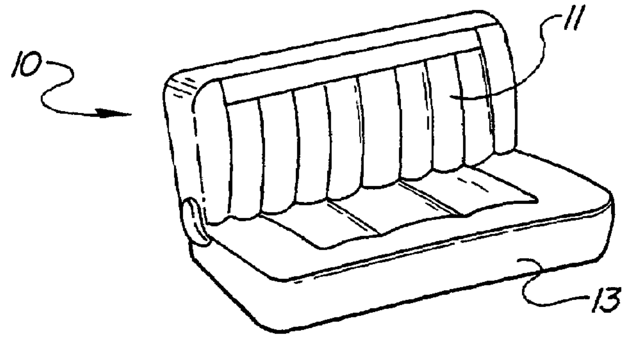
FIG. 1 is a perspective view of a vehicle seat.

Referring to the Figures, wherein like numerals indicate like or corresponding parts throughout the several views, a vehicle seat is generally shown at 10 in FIG. 1. The vehicle seat 10 includes a seat back 11 and a seat cushion 13, which are typically formed from a molded urethane foam substrate 12 that is surrounded by a decorative trim cover 14. The trim cover 14 may comprise a woven fabric, a non-woven fabric, leather, vinyl, or a combination thereof.

Figure 2:
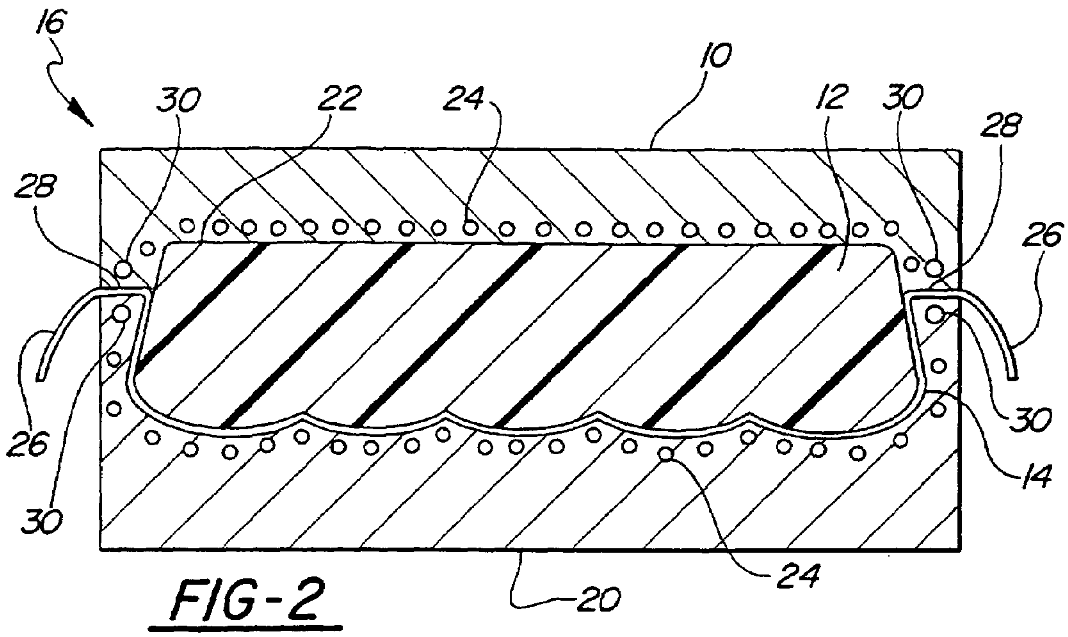
FIG. 2 is a cross-sectional view of a vehicle seat mold tool having an upper cast and a lower cast.
Figure 3:
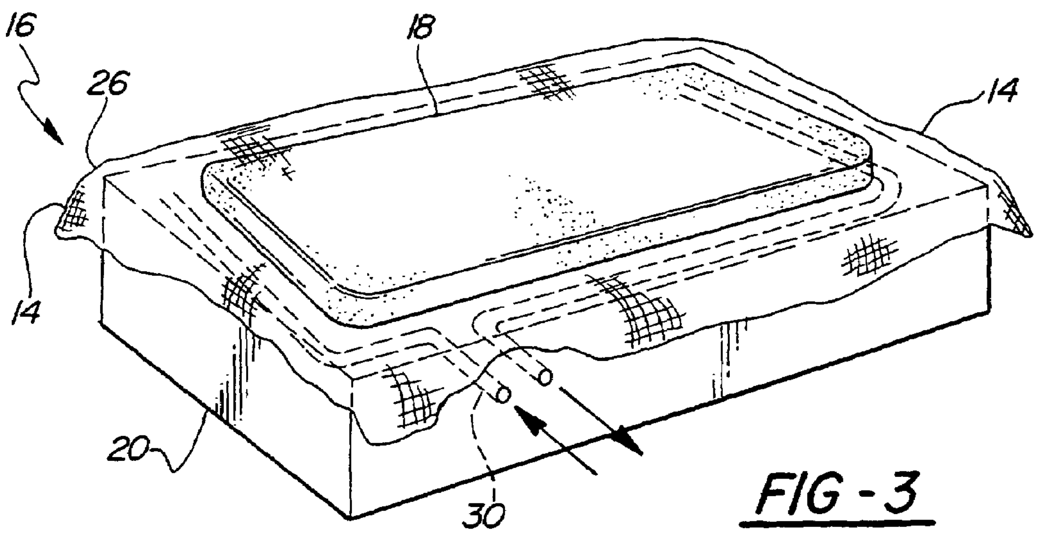
FIG. 3 is a perspective view of the lower cast of the mold tool.

Referring to FIGS. 2 and 3, the method for manufacturing the vehicle seat 10 includes a clam style mold tool 16 having an upper cast 18 defining an upper mold surface 19 and a lower cast 20 defining a lower mold surface 21. When in mating engagement, the upper cast 18 and the lower cast 20 form a cavity 22 therebetween wherein the urethane molding takes place.

A mold release agent, as is commonly known to one skilled in the art, is sprayed into the cavity 22 and onto the lower mold surface 21 prior to introducing liquid urethane into the cavity 22 for preventing the urethane from sticking to the lower mold surface 21 of the mold tool 16 as it cures. Subsequent to applying the mold release agent, the trim cover 14 is placed into the open mold 10 either by affixing the cover 14 to the upper cast 18 via a fastener, by vacuum pressure, or by laying the trim cover 14 into the lower cast 20. The trim cover 14 includes a thermally activated adhesive, as known to one skilled in the art, for affixing the cover 14 to the urethane substrate 12. Additionally, the mold release agent is often thermally activated. There are a plurality of heat lines 24 running through the mold tool 16 adjacent the upper 19 and lower 21 mold surfaces of the cavity 22 for providing heat to the cavity 22. The urethane cross-linking reaction is an exothermic reaction, which also provides heat to the mold tool 16.

As best shown in FIGS. 2 and 3, the trim cover 14 includes a skirt 26 defined by a portion of the outer periphery of the cover 14 that extends out of the cavity, 22 when the upper and lower casts 18.20 are in mating engagement. The outer periphery of the upper 19 and lower 21 mold surfaces of the upper 18 and lower 20 casts define a split line 28 when in mating engagement having the skirt 26 of the trim cover 14 disposed therebetween. The split line 28 is generally 7 mm wide.

After the molding process, the upper cast 18 is removed. The skirt 26 is then wrapped around the cured urethane substrate 12 and affixed to a back surface thereof. The cover 14 may include a textured outer surface, such as a flocking surface, which may become disfigured by the split line 28 leaving a depression in the cover 14. Due to the heat generated in the mold 10 from the exothermic reaction of the urethane and from the heat lines 24, the depression may become a permanent disfigurement in the trim cover 14. Thus, an additional manufacturing step of steaming the cover 14 is required to restore the flocking. However, less expensive, lower quality covers 14 remain disfigured, even after the steaming step, reducing the feasibility of using these types of covers 14.

The subject invention, therefore, includes a cooling line 30 in the lower cast 20 adjacent the split line 28 for cooling the split line 28 and preventing the skirt 26 of the trim cover 14 disposed therein from being heated. The absence of heat at the split line 28 eliminates any amount of disfigurement to the outer surface of the trim cover 14 and eliminates the need for the step of steaming the cover for restoring proper texture. Additionally, cooling the split line 28 reduces disfigurement to the less expensive, lower quality covers 14 allowing for increased usage of these covers. An additional cooling line 30 can be placed in the upper cast 18 adjacent the split line 28 for providing further cooling as shown in FIG. 2. The cooling lines 30 are generally 15 mm from the split line and lower the temperature of the split line 28 by approximately 10° C. from the overall mold 10 temperature.

Accordingly, the method for manufacturing the vehicle seat 10 includes the first step of spraying a mold release agent into the mold tool cavity 22 and onto the lower mold surface 21. The second step includes securing the trim cover 14 onto the upper cast with hook and loop fasteners, clamps, vacuum pressure, or an equivalent. The third step is spraying liquid urethane into the cavity 22. The fourth step includes moving the upper cast 18 into mating engagement with the lower cast 20 such that a the skirt portion 26 of the trim cover 14 is secured therebetween in the area defined as the split line 28. The fifth step is simultaneously cooling the split line 28 between the upper and lower casts 18,20 through the cooling line 30 and heating the upper and lower casts 18,20 through the heat lines 24. The trim cover 14 is bonded to the urethane substrate 12 and then the sixth step is removing the cured trim covered urethane foam substrate 12 from the cavity 22.

The cooling of the split line 28 is preferably accomplished by circulating cooling fluid, such as cool water, through the cooling line 30 in the upper 18 and/or lower 20 mold cast. The cooling could also be accomplished by other means such as cool air. The heating of the mold tool 16 is preferably and typically accomplished by circulating heated fluid, such as hot water, hot air, or steam, through the heat lines 24 in the mold casts 18, 20.

The invention has been described in an illustrative manner, and it is to be understood that the terminology which has been used is intended to be in the nature of words of description rather than of limitation.

Many modifications and variations of the present invention are possible in light of the above teachings. It is, therefore, to be understood that the invention may be practiced otherwise than as specifically described.

What is claimed is:

1. A mold tool for forming a trim covered foam substrate of a seat assembly comprising:

an upper mold cast defining an upper mold surface;

a lower mold cast defining a lower mold surface;

a split line defined adjacent to and around the outer perimeter of said upper and lower mold surfaces between said upper mold cast and said lower mold cast when said mold casts are in facing mating engagement forming a mold cavity therebetween;

a plurality of heat lines extending through at least one of said upper and lower mold casts adjacent said respective upper and lower mold surfaces for heating said mold cavity; and a cooling line extending through at least one of said upper and lower mold casts adjacent said split line and spaced outside and extending around the perimeter of said mold cavity for cooling said split line of said mold tool while said heat lines independently heat said mold cavity.

2. A method of forming a trim covered foam substrate of a seat assembly comprising the steps of:

providing a mold tool having an upper mold cast defining an upper mold surface and a lower mold cast defining a lower mold surface;

securing a trim cover onto the upper mold surface;

spraying urethane foam onto the lower mold surface;

moving the upper mold cast into facing mating engagement with the lower mold cast to define a mold cavity therebetween;

extending a skirt portion of the trim cover through a split line defined adjacent to the upper and lower mold surface and between the upper and lower mold cast;

heating the mold cavity by circulating heated fluid through a plurality of heat lines within the upper and lower mold casts adjacent the respective upper and lower mold surfaces;

simultaneously cooling the split line while heating the mold cavity by circulating cooling fluid through a cooling line within one of the upper and lower mold cast adjacent the split line; and curing the urethane foam to bond the trim cover thereto with the mold cavity.

3. A mold tool as set forth in claim 1 wherein said upper mold surface is defined by a contoured surface recessed in the face of said upper mold surface and bound by an outer peripheral upper raised rim.

4. A mold tool as set forth in claim 3 wherein said lower mold surface is defined by a contoured surface recessed in the face of said lower mold surface and bond by an outer peripheral lower raised rim.

5. A mold tool as set forth in claim 4 wherein said split line is further defined between said upper raised rim and said lower raised rim with said mold casts in facing mating engagement forming said mold cavity therebetween.

* * * * *